(12) United States Patent
Chen et al.

(10) Patent No.: US 8,329,130 B2
(45) Date of Patent: Dec. 11, 2012

(54) METHOD OF SYNTHESIZING CRYSTALLINE POLYMERIC BORON-NITROGEN COMPOUND AND DEHYDROGENATION OF BORON-NITROGEN-HYDROGEN COMPLEX

(75) Inventors: Ping Chen, Dalian (CN); Teng He, Dalian (CN); Zhitao Xiong, Dalian (CN); Guotao Wu, Dalian (CN)

(73) Assignee: Dalian Institute of Chemical Physics, Chinese Academy of Sciences, Dalian (CN)

( * ) Notice: Subject to any disclaimer, the term of this patent is extended or adjusted under 35 U.S.C. 154(b) by 0 days.

(21) Appl. No.: 12/840,157

(22) Filed: Jul. 20, 2010

(65) Prior Publication Data

US 2011/0158881 A1    Jun. 30, 2011

(30) Foreign Application Priority Data

Dec. 30, 2009  (CN) .......................... 2009 1 0248936

(51) Int. Cl.
| | |
|---|---|
| *C01B 21/064* | (2006.01) |
| *C01B 35/14* | (2006.01) |
| *C01B 3/08* | (2006.01) |
| *C01B 3/02* | (2006.01) |
| *C01B 3/00* | (2006.01) |
| *B01J 10/00* | (2006.01) |
| *H01M 8/06* | (2006.01) |

(52) U.S. Cl. ........ 423/290; 423/285; 423/657; 423/648; 422/129; 429/421; 252/188.25

(58) Field of Classification Search .................. None
See application file for complete search history.

(56) References Cited

U.S. PATENT DOCUMENTS

2011/0008693 A1 *  1/2011  Yang et al. .................... 429/421

FOREIGN PATENT DOCUMENTS

WO    WO 2008141439 A1 *  11/2008

OTHER PUBLICATIONS

Sneddon et al.; Amineborane-Based Chemical hydrogen Storage; Enhanced Ammonia Borane Dehydrogenation in Ionic Liquids; journal American Chem. Soc.; 128, 7748-7749; 2006.*
Goldberg et al.; Efficient Catalysis of Ammonia Borane Dehydrogenation; Journal of American Chem. Soc.; 128, 12048-12049; 2006.*
Bluhm et al., "Amineborane-based chemical hydrogen storage: enhanced ammonia borane dehydrogenation in ionic liquids," Journal of the American Chemical Society, 2006, vol. 128, pp. 7748-7749.

(Continued)

*Primary Examiner* — Melvin C Mayes
*Assistant Examiner* — Guinever Gregorio
(74) *Attorney, Agent, or Firm* — Knobbe Martens Olson & Bear LLP

(57) ABSTRACT

The present invention provides a method for synthesis of crystalline polymeric boron-nitrogen compounds comprising a step of dehydrogenation of a boron-nitrogen-hydrogen compound on catalyst, wherein the boron-nitrogen-hydrogen compound is selected from the group consisting of ammonia borane, metal amidoboranes, amine boranes or mixtures thereof, and the catalyst is selected from the group consisting of transition metals, transition metal salts or alloys.

8 Claims, 3 Drawing Sheets

OTHER PUBLICATIONS

Denney et al., "Efficient catalysis of ammonia borane dehydrogenation," Journal of American Chemical Society, 2006, vol. 128, pp. 12048-12049.

He et al., "Nanosized Co- and Ni-catalyzed ammonia borane for hydrogen storage," Chemistry of Materials, 2009, vol. 21, No. 11, pp. 2315-2318.

Himmelberger et al., "Base-promoted ammonia borane hydrogen-release," Journal of American Chemical Society, 2009, vol. 131, pp. 14101-14110.

Keaton et al., "Base metal catalyzed dehydrogenation of ammonia-borane for chemical hydrogen storage," Journal of American Chemical Society, 2007, vol. 129, pp. 1844-1845.

Stephens et al., "Acid initiation of ammonia-borane dehydrogenation for hydrogen storage," Angewandte Chemie Int. Ed., 2007, vol. 119, p. 760.

Wolf et al. "Calorimetric process monitoring of thermal decomposition of B-N-H compounds," Thermochimica Acta 343, 2000, pp. 19-25.

* cited by examiner

METHOD OF SYNTHESIZING CRYSTALLINE POLYMERIC BORON-NITROGEN COMPOUND AND DEHYDROGENATION OF BORON-NITROGEN-HYDROGEN COMPLEX

This application claims the benefit of Chinese Patent Application Number 200910248936.5 filed on Dec. 30, 2009, the disclosure of which is hereby expressly incorporated by reference in its entirety and hereby expressly made a portion of this application.

FIELD OF THE INVENTION

The present invention relates to the method of preparing a crystalline polymeric boron-nitrogen compound (hereinafter referred to as "B—N compound") via dehydrogenation of boron-nitrogen-hydrogen compound (hereinafter referred to as "B—N—H compound") in the presence of a catalyst.

BACKGROUND OF THE INVENTION

Recently, ammonia borane ($NH_3BH_3$, hereinafter referred to as "AB") has been paid much attention due to its high stoichiometric hydrogen content (19.6 wt %) to meet the need of "hydrogen economy". Dehydrogenation of AB is a three steps reaction, giving one equivalent $H_2$ at each step. In the first step, polymeric aminoborane ($[NH_2BH_2]_n$) as the main product is obtained with one equivalent $H_2$ released around 110° C.[1].

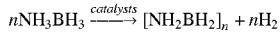

$$nNH_3BH_3 \xrightarrow{catalysts} [NH_2BH_2]_n + nH_2$$

However, the polymeric aminoborane, which was generally described as polyaminoborane (hereinafter referred to as "PAB"), is actually a mixture of amorphous linear, branched and cyclic oligomers and polymers. At the same time, researchers used transition metal, acid, base and ionic liquid to catalyze dehydrogenation of AB in solution[2-5]. But the crystallinity of products was either amorphous or not mentioned. Heinekey et al. catalyzed dehydrogenation of AB by using $(POCOP)Ir(H)_2$ in THF solution to obtain cyclic pentamer $(NH_2BH_2)_5$[6]. However, the catalyst $(POCOP)Ir(H)_2$ is a complex metal organic compound which is not convenient to get. No other reports were published about the formation of crystalline PAB from the dehydrogenation of AB.

As derivatives of AB, metal amidoboranes and amine boranes can also dehydrogenate under certain condition or on catalysts. However, no reports were published about the crystallinity of the post-dehydrogenated products through solid reaction.

SUMMARY OF THE INVENTION

Therefore, the present invention provides a method of synthesizing crystalline B—N compound through dehydrogenation of ammonia borane, metal aminoboranes or amine boranes using common and cheap chemicals as catalysts, such as, for example, transition metals, transition metal salts, and alloys.

According to one aspect of the invention, there is provided a method for synthesis of crystalline polymeric B—N compounds comprising a step of dehydrogenation of a B—N—H compound on catalyst, wherein the B—N—H compound is selected from the group consisting of ammonia borane, metal amidoboranes, amine boranes or mixtures thereof, and the catalyst is selected from the group consisting of transition metals, transition metal salts or alloys.

DETAILED DESCRIPTION OF THE INVENTION

Figure 1:
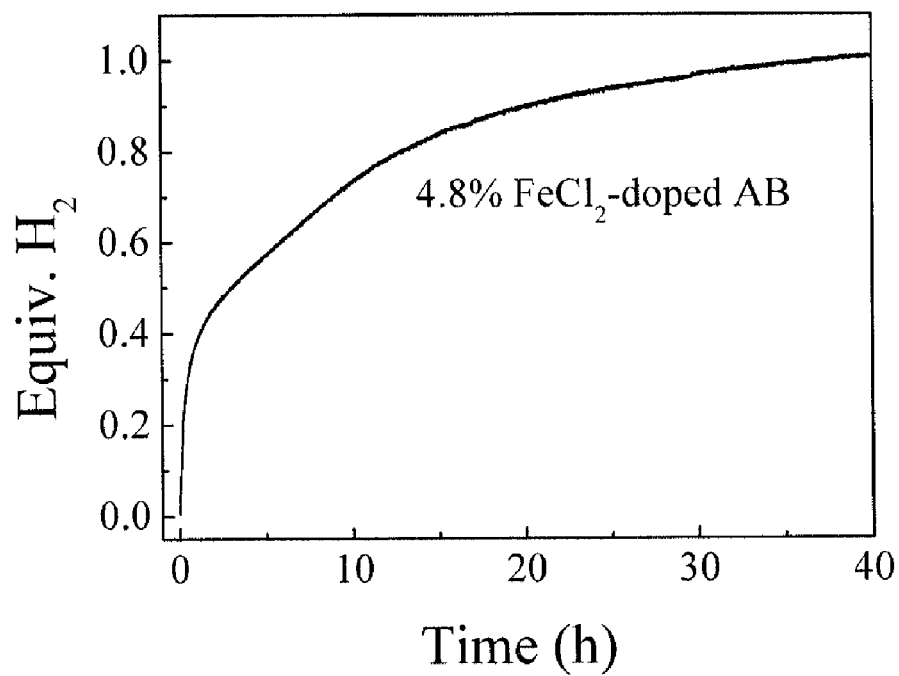
FIG. 1 shows a graph of volumetric release measurement on 4.8 mol % $FeCl_2$-doped AB at 60° C.

In the description, unless otherwise indicated, the term "B—N compound" means a compound mainly composed of boron and nitrogen atoms, the term "B—N—H compound" means a compound mainly composed of boron, nitrogen and hydrogen atoms.

The present invention provides a method for producing B—N compounds through catalytic dehydrogenation of B—N—H compounds. Specifically, the present invention provides a method for synthesis of crystalline polymeric B—N compounds comprising a step of dehydrogenation of a B—N—H compound on catalyst, wherein the B—N—H compound is selected from the group consisting of ammonia borane, metal amidoboranes, amine boranes or mixtures thereof, the catalyst is selected from the group consisting of transition metals, transition metal salts or alloys.

According to certain preferred embodiments, the polymeric B—N compound has a composition of $[NRR'BH_2]_n$, or $[R(NHBH_2)_2]_n$ in which $n \geq 2$, the R and R' each independently represents one selected from the group consisting of H, Li, Na, K, Mg, Ca and organic groups -Me (methyl), -Pr (propyl), -Et (ethyl), and -Ph (phenyl).

According to certain preferred embodiments, the B—N—H compound is ammonia borane.

According to certain preferred embodiments, the catalytic dehydrogenation is conducted in solid or in solution, more preferably in solid form. Preferably, the catalytic dehydrogenation is conducted at a mild condition. In case of solid dehydrogenation, the catalysts or catalyst precursors are dispersed in ammonia borane by using conventional techniques, such as, for example, stirring, ball milling or co-precipitation [7] method, in which co-precipitation method is preferred.

According to certain preferred embodiments, the transition metal is at least one element selected from the group consisting of Group IB, Group IIB, Group IIIB, Group IVB, Group VB, Group VIB, Group VIIB and Group VIIIB in the Periodic Table of Elements. More preferably, the transition metal is at least one element selected from the group consisting of iron (Fe), cobalt (Co), nickel (Ni), copper (Cu), ruthenium (Ru), rhodium (Rh), palladium (Pd), silver (Ag), platinum (Pt) and gold (Au).

According to certain preferred embodiments, the transition metal salt is selected from the group consisting of organometallics, carbonates ($CO_3^-$), nitrates ($NO_3^-$), halides ($X^-$), phosphates ($PO_4^{3-}$), sulfates ($SO_4^{2-}$), and acetates ($CH_2COOH^-$).

According to certain preferred embodiments, the alloy is a binary or multiple metal-metal alloy or a metal-metalloid alloy. More preferably, the alloy is an alloy of at least one transition metal and at least one element selected from the group consisting of B, C and N.

According to certain preferred embodiments, the molar ratio of B—N—H compound to catalyst is in a range from 100,000:1 to 1:1, more preferably, from 1,000:1 to 5:1.

According to certain preferred embodiments, the method is conducted on a temperature range from −100 to 300° C., more preferably, from −20 to 150° C.

The B—N—H compounds are high hydrogen content materials, which should be conducted carefully. Thus, the operation of them is preferably conducted under inert atmosphere, for example, under an inert gas such as Ar or $N_2$ among others.

Taking PAB as an example, the reaction mechanism and operation conditions are illustrated below. The formation of crystalline PAB from catalytic dehydrogenation of ammonia borane followed following reaction:

$$n NH_3BH_3 \xrightarrow{catalysts} [NH_2BH_2]_n + nH_2 \quad n \geq 2.$$

For $[NH_2BH_2]_n$, preferably, n=2, 3, 4, 5, or 6.

The catalytic dehydrogenation of AB is carried out preferably in a closed system under inert gas or vacuum. The quantity of hydrogen release is preferably from about 0.5 equivalent hydrogen to about 1.5 equivalent hydrogen. The reaction time is preferably from about 1 hour to about 100 hours.

Figure 5:
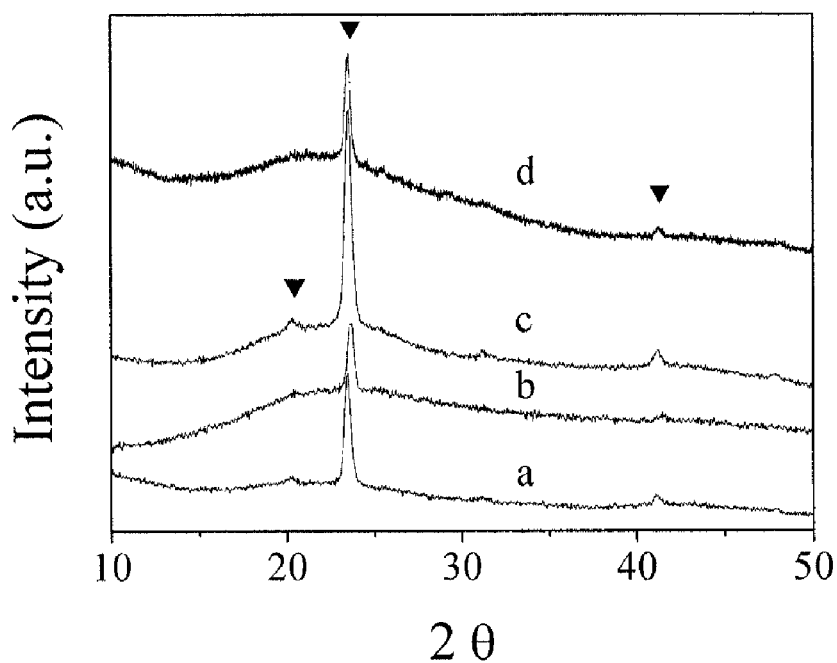
FIG. 5 shows XRD patterns of crystalline cyclopentaborazane from post-dehydrogenated 4.8 mol % $FeCl_2$ (a), $CoCl_2$ (b) and $NiCl_2$ (c)-doped AB and 2.0 mol % $FeCl_2$ (d)-doped AB samples. (▼: cyclopentamer)
Figure 6:
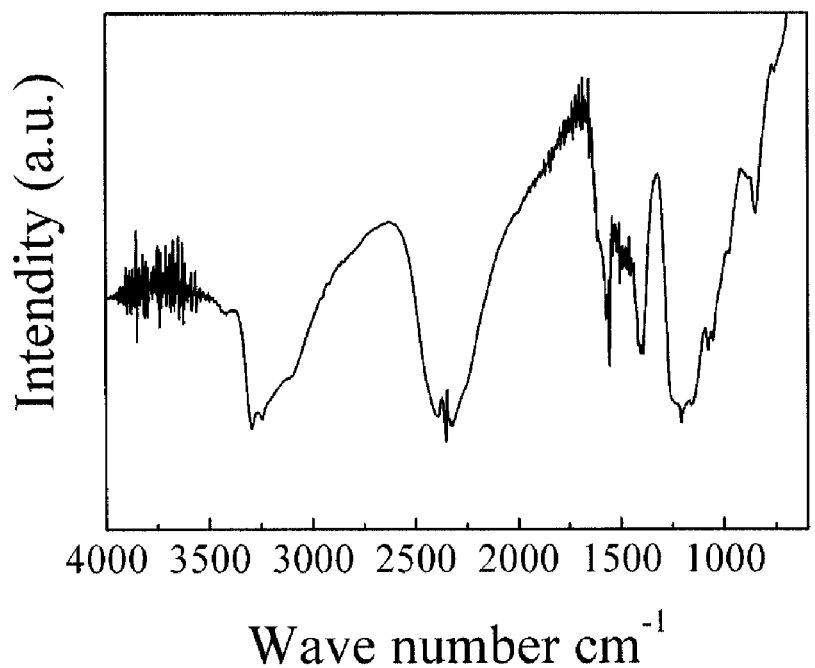
FIG. 6 shows infrared spectrum of cyclopentaborazane from post-dehydrogenated 4.8 mol % $FeCl_2$ at 60° C.

The products of polymeric B—N compounds are examined by X-ray diffraction and infrared spectrum as shown in FIGS. 5 and 6.

EXAMPLES

Example 1

31.8 mg ($2.5 \times 10^{-4}$ mol) $FeCl_2$ was put into 10 ml THF and sonicated for 20 min. Then, 159.8 mg ($5 \times 10^{-3}$ mol) AB was added into the $FeCl_2$-THF solution or suspension. THF was removed immediately by a rotary evaporator at room temperature. 4.8 mol % $FeCl_2$-doped AB sample was made. Samples were vacuumed overnight and then preserved below 10° C. to avoid self-decomposition. Volumetric release measurement on the 4.8 mol % $FeCl_2$-doped AB sample was carried out under Ar atmosphere at 60° C. and the result was shown in FIG. 1. About 1.0 equivalent $H_2$ was released from $FeCl_2$-doped AB sample in about 40 hrs. Product was examined by XRD (X-ray Diffraction) and the result was shown in FIG. 5. The crystalline PAB was indentified as crystalline cyclopentaborazane.

Example 2

Figure 2:
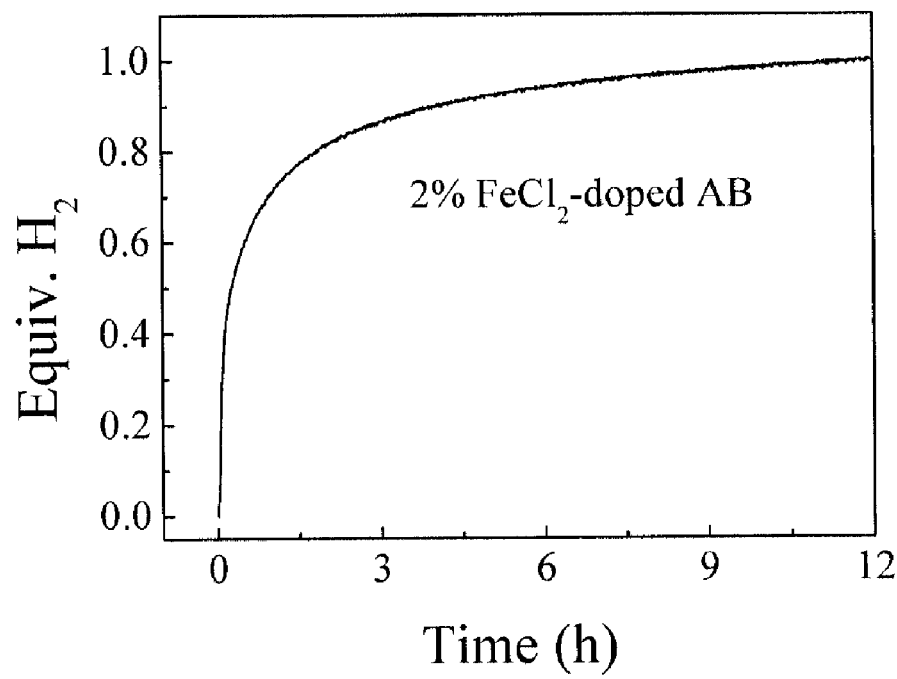
FIG. 2 shows a graph of volumetric release measurement on 2.0 mol % $FeCl_2$-doped AB at 80° C.

13.1 mg $FeCl_2$ was doped into 159.8 mg AB following the procedure of Example 1 to make 2.0 mol % $FeCl_2$-doped AB sample. Volumetric release measurement on the $FeCl_2$-doped AB sample was carried out under Ar atmosphere at 80° C. and the result was shown in FIG. 2. About 1.0 equivalent $H_2$ was released from $FeCl_2$-doped AB sample in about 12 hrs. Product was examined by XRD and the result was shown in FIG. 5. The crystalline PAB was indentified as crystalline cyclopentaborazane.

Example 3

Figure 3:
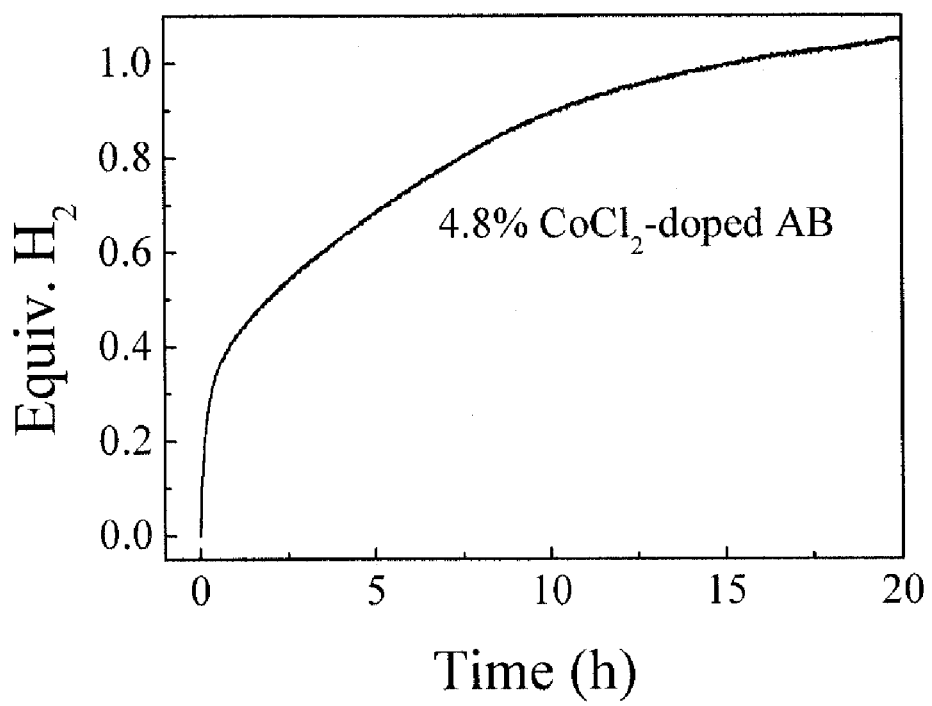
FIG. 3 shows a graph of volumetric release measurement on 4.8 mol % $CoCl_2$-doped AB at 60° C.

33.5 mg $CoCl_2$ was doped into 159.8 mg AB following the procedure of Example 1 to make 4.8 mol % $CoCl_2$-doped AB sample. Volumetric release measurement on the $CoCl_2$-doped AB sample was carried out under Ar atmosphere at 60° C. and the result was shown in FIG. 3. About 1.0 equivalent $H_2$ was released from $CoCl_2$-doped AB sample in about 20 hrs. Product was examined by XRD and the result was shown in FIG. 5. The crystalline PAB was indentified as crystalline cyclopentaborazane.

Example 4

Figure 4:
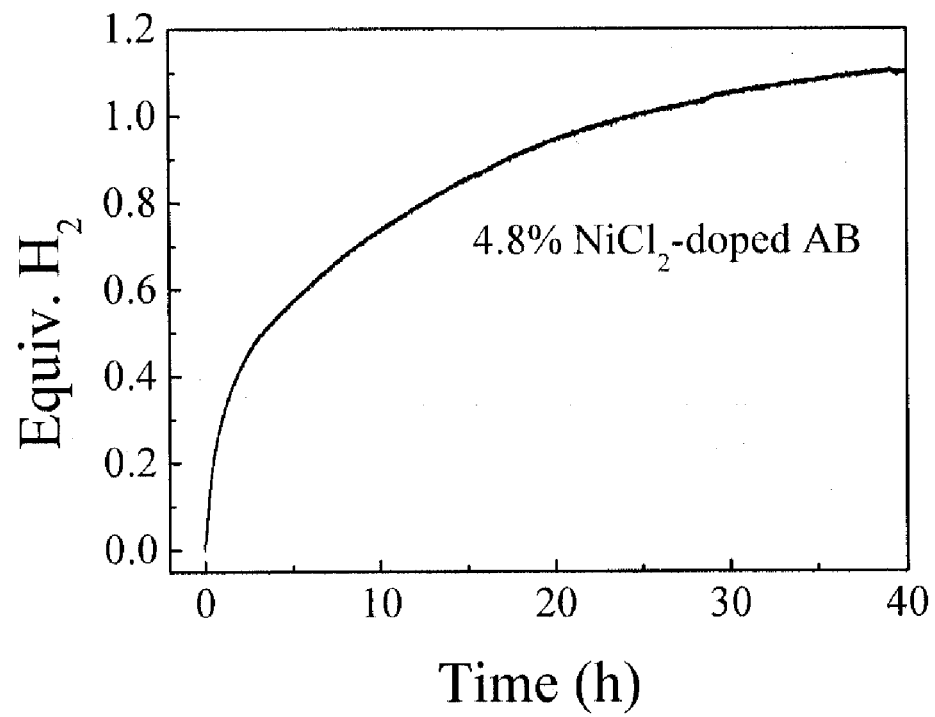
FIG. 4 shows a graph of volumetric release measurement on 4.8 mol % $NiCl_2$-doped AB at 60° C.

33.5 mg $NiCl_2$ was doped into 159.8 mg AB following the procedure of Example 1 to make 4.8 mol % $NiCl_2$-doped AB sample. Volumetric release measurement on the $NiCl_2$-doped AB sample was carried out under Ar atmosphere at 60° C. and the result was shown in FIG. 4. About 1.0 equivalent $H_2$ was released from $NiCl_2$-doped AB sample in about 20 hrs. Product was examined by XRD and the result was shown in FIG. 5. The crystalline PAB was indentified as crystalline cyclopentaborazane.

References

[1] G Wolf, J. Baumann, F. Baitalow, F. P. Hoffmann, *Thermochimica Acta* 2000, 343, 19.
[2] R. J. Keaton, J. M. Blacquiere, R. T. Baker, *J. Am. Chem. Soc.* 2007, 129, 1844.
[3] F. H. Stephens, R. T. Baker, M. H. Matus, D. J. Grant, D. A. Dixon, *Angew. Chem. Int. Ed.* 2007, 119, 760.
[4] D. W Himmelberger, C. W. Yoon, M. E. Bluhm, P. J. Carroll, L. G Sneddon, *J. Am. Chem. Soc.* 2009, 131, 14101.
[5] M. E. Bluhm, M. G Bradley, R. Butterick, U. Kusari, L. G Sneddon, *J. Am. Chem. Soc.* 2006, 128, 7748.
[6] M. C. Denney, V. Pons, T. J. Hebden, D. M. Heinekey, K. I. Goldberg, *J. Am. Chem. Soc.* 2006, 128, 12048.
[7] T. He, Z. Xiong, G Wu, H. Chu, C. Wu, T. Zhang, P. Chen, *Chem. of Mate.* 2009, 21, 2315.

What is claimed is:

1. A method for synthesis of crystalline polymeric boron-nitrogen compounds comprising:
   dehydrogenating a boron-nitrogen-hydrogen compound on a catalyst through self-decomposition of the boron-nitrogen-hydrogen compound, and wherein the boron-nitrogen-hydrogen compound is selected from the group consisting of ammonia borane, metal amidoboranes, amine boranes and mixtures thereof, and the catalyst is selected from the group consisting of transition metals, transition metal salts and alloys, wherein said dehydrogenating is conducted in solid form in the absence of solvent,
   wherein the transition metal is at least one element selected from the group consisting of iron (Fe), cobalt (Co), Nickel (Ni), copper (Cu), ruthenium (Ru), rhodium (Rh), palladium (Pd), silver (Ag), platinum (Pt) and gold (Au);
   wherein the transition metal salt comprises at least one selected from the group consisting of organometallics, carbonates (CO$_3^-$), nitrates (NO$_3^-$), halides (X$^-$), phosphates (PO$_4^{3-}$) sulfates (SO$_4^{2-}$) and acetates (CH$_2$COOH$^-$); and wherein the polymeric boron-nitrogen compounds synthesized are in crystalline form.

2. The method according to claim 1, wherein the boron-nitrogen-hydrogen compound is ammonia borane.

3. The method according to claim 1, wherein the alloy is a binary or multiple metal-metal alloy or a metal-metalloid alloy.

4. The method according to claim 3, wherein the alloy comprises at least one transition metal alloyed with at least one element selected from the group consisting of B, C and N.

5. The method according to claim 1, wherein a molar ratio of boron-nitrogen-hydrogen compound to the catalyst is in a range from 100,000:1 to 1:1.

6. The method according to claim 5, wherein the molar ratio of boron-nitrogen-hydrogen compound to the catalyst is from 1,000:1 to 5:1.

7. The method according to claim 1, wherein the method is conducted on a temperature range from −100 to 300° C.

8. The method according to claim 7, wherein the temperature is from −20 to 150° C.

* * * * *